United States Patent
Forgang et al.

(10) Patent No.: US 8,942,941 B2
(45) Date of Patent: Jan. 27, 2015

(54) CURRENT-TO-VOLTAGE CONVERTERS WITH DYNAMIC FEEDBACK

(75) Inventors: Stanislav W. Forgang, Houston, TX (US); Luis M. Pelegri, Humble, TX (US)

(73) Assignee: Baker Hughes Incorporated, Houston, TX (US)

(*) Notice: Subject to any disclaimer, the term of this patent is extended or adjusted under 35 U.S.C. 154(b) by 493 days.

(21) Appl. No.: 12/899,264

(22) Filed: Oct. 6, 2010

(65) Prior Publication Data

US 2011/0102023 A1 May 5, 2011

Related U.S. Application Data

(60) Provisional application No. 61/250,078, filed on Oct. 9, 2009.

(51) Int. Cl.
*H02M 11/00* (2006.01)
*H03K 3/00* (2006.01)
*G01V 3/26* (2006.01)

(52) U.S. Cl.
CPC .................................. *G01V 3/26* (2013.01)
USPC ................................ 702/104; 702/7; 702/107

(58) Field of Classification Search
USPC ......................................................... 702/104
See application file for complete search history.

(56) References Cited

U.S. PATENT DOCUMENTS

| | | | |
|---|---|---|---|
| 4,551,681 A | 11/1985 | Seeley | |
| 5,500,597 A * | 3/1996 | Tickell et al. | 324/339 |
| 5,570,024 A | 10/1996 | Vail, III | |
| 6,100,696 A * | 8/2000 | Sinclair | 324/339 |
| 7,031,839 B2 | 4/2006 | Tabarovsky et al. | |
| 7,256,582 B2 | 8/2007 | Gorek et al. | |
| 7,437,251 B2 | 10/2008 | Wang et al. | |
| 7,797,111 B2 * | 9/2010 | Forgang et al. | 702/11 |
| 2007/0103159 A1 | 5/2007 | Forgang et al. | |
| 2007/0133161 A1 | 6/2007 | Lin | |
| 2008/0252296 A1 | 10/2008 | Hu et al. | |
| 2009/0143989 A1 * | 6/2009 | Forgang et al. | 702/7 |

* cited by examiner

*Primary Examiner* — Andrew Schechter
*Assistant Examiner* — Daniel Kessie
(74) *Attorney, Agent, or Firm* — Mossman Kumar & Tyler PC

(57) ABSTRACT

An apparatus for modifying an output signal indicative of a downhole parameter that may include a carrier conveyable in a wellbore; a negative error compensator; and an output signal device. The negative error compensator may be configured to modify the output of the device to increase or decrease a characteristic of the output signal from the output signal device. Also, a method for modifying an output signal indicative of a downhole parameter that may include modifying a characteristic of an output signal produced by a output signal device in a wellbore using a negative error compensator.

18 Claims, 3 Drawing Sheets

CURRENT-TO-VOLTAGE CONVERTERS WITH DYNAMIC FEEDBACK

CROSS-REFERENCES TO RELATED APPLICATIONS

This application claims priority from U.S. Provisional Patent Application Ser. No. 61/250,078 filed on 9 Oct. 2009.

BACKGROUND OF THE DISCLOSURE

1. Field of the Disclosure

This disclosure generally relates to devices and methods for enhancing the operation of wellbore tools used in connection with investigating subsurface formations.

2. Background of the Art

To obtain hydrocarbons such as oil and gas, boreholes are drilled into the earth by rotating a drill bit attached to the end of a drill string. Modern drilling systems may employ downhole instruments, known as logging-while-drilling (LWD) tools or measurement-while-drilling (MWD) tools to determine the formation geology, formation fluid characteristics and parameters of interest. Wireline logging tools are typically used after the drilling of the wellbore to determine formation geology and formation fluid characteristics.

The wellbore environment can pose a variety of challenges to downhole data collection, and in particular to data collection involving electromagnetic signals. The present disclosure addresses the need to protect sensors from electrical interferences due to conditions that include, but are not limited to, galvanic leakage between sensor terminals.

SUMMARY OF THE DISCLOSURE

In aspects, the present disclosure is related to an apparatus and method for estimating properties of a downhole parameter obtained by a logging tool used to measure resistivity of an earth formation in a borehole. More particularly, the present disclosure relates to a modifying a signal indicative of the downhole parameter to adjust for the effect of at least one characteristic of the signal.

In another aspect, the present disclosure relates to an apparatus for modifying an output signal indicative of a downhole parameter, comprising: a carrier conveyable in a wellbore; an output signal device disposed on the carrier, the output signal device configured to produce the output signal; a negative error compensator in communication with the device, the negative error compensator configured to modify a characteristic of the output signal.

In still another aspect, the present disclosure relates to a method for modifying an output signal indicative of a downhole parameter, comprising: modifying a characteristic of the output signal produced by an output signal device in a wellbore using a negative error compensator.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Figure 1:
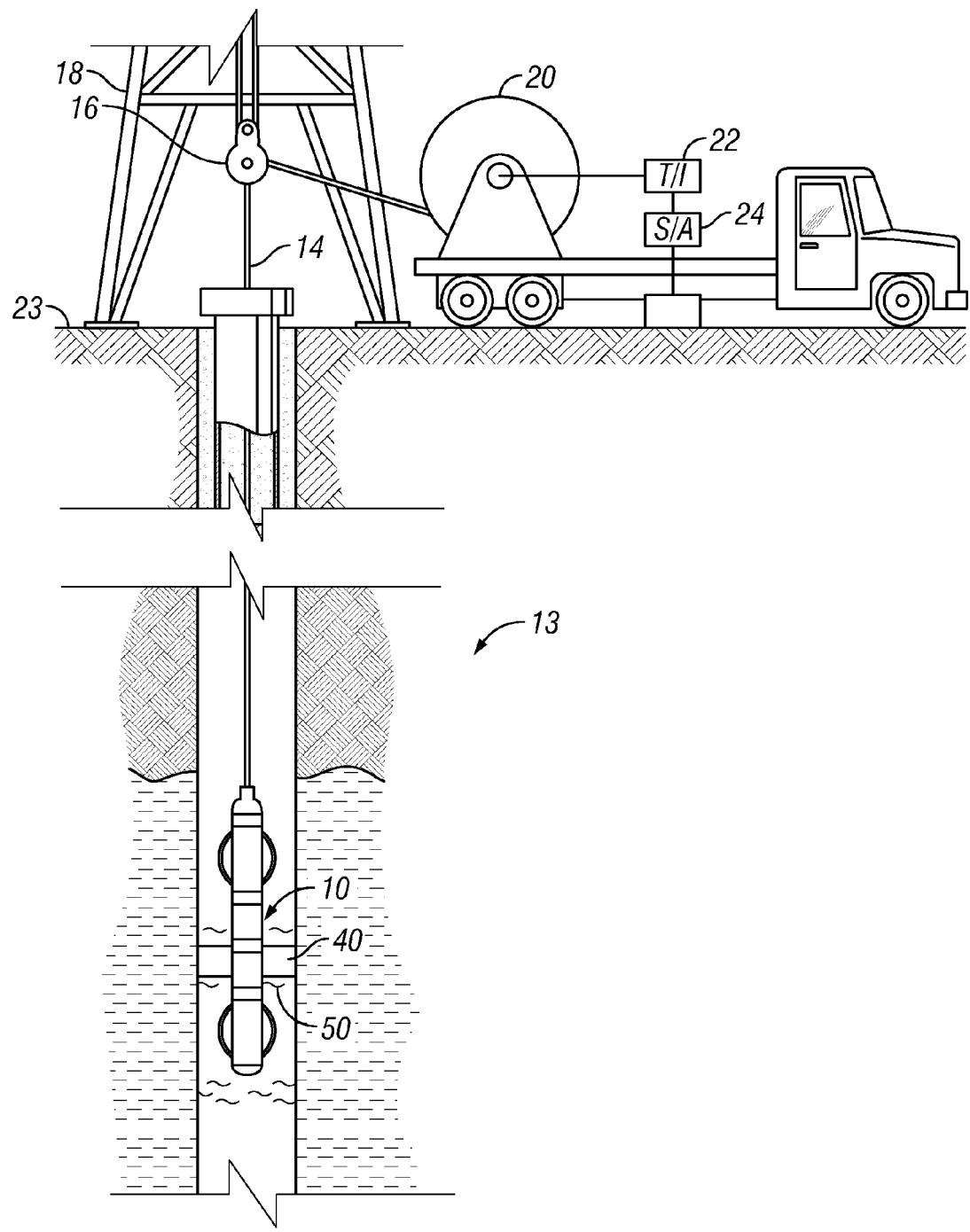
FIG. 1 shows a resistivity tool of one embodiment according to the present disclosure.

The present disclosure relates to apparatuses and methods for estimating properties of a downhole parameter obtained by a logging tool used to measure resistivity of an earth formation in a borehole, and, more particularly minimizing electrical interference with sensors due to undesirable conditions such as galvanic leakage between their terminals. Downhole parameters that may be estimated using embodiments according to the present disclosure include, but are not limited to, resistivity, conductivity, permittivity, dielectric constant, pressure, porosity, gravitational force, and acceleration. The present disclosure is susceptible to embodiments of different forms. There are shown in the drawings, and herein will be described in detail, specific embodiments of the present disclosure with the understanding that the present disclosure is to be considered an exemplification of the principles described herein, and is not intended to limit the disclosure to that illustrated and described herein.

Merely for ease in explanation, the present teachings will be discussed in connection with electrical logging devices, of which a resistivity tool is merely illustrative. Several embodiments of this disclosure may be used for imaging subsurface formations. Electrical resistivity logging devices may employ a measuring electrode (primarily used as a current sink) in conjunction with a large diffuse electrode (such as the tool body) conventionally acting as a current injector. A measuring current due to applying a voltage from the source situated inside the tool flows in a circuit that connects its electrodes through a series circuit incorporating the diffuse electrode, the earth formation, and the measuring electrode.

There are several modes of operation: in one mode, the current at the measuring electrode is maintained relatively constant and an electric potential of this electrode is measured. In another mode, the electric potential of the electrode may be fixed and the current flowing from or into the electrode may be measured. Embodiments of the present disclosure minimize the effects of electrical leakage near the sensor from adversely affecting the measured current.

As shown in FIG. 1, a resistivity tool 10 may be suspended in a borehole 12, which penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 may be raised and lowered by draw works 20. Electronic module 22, on the surface 23, may transmit the required operating commands downhole and in return, receives data back, which may be recorded on an archival storage medium of any desired type for concurrent or later processing. The data may be transmitted in analog or digital form. Data processors, such as a suitable computer 24, may be provided for performing data analysis in the field in real time or the recorded data may be sent to a processing center or both for post processing of the data. Some of the data processing may also be done by a downhole computer. While a wireline conveyance system has been shown, it should be understood that embodiments of the present disclosure may be utilized in connection with tools conveyed via rigid carriers (e.g., jointed tubular or coiled tubing) as well as non-rigid carriers (e.g., wireline, slickline, e-line, etc.).

Resistivity tool 10 may be in contact with earth formation 13 when performing various measurement operations. The point of contact may be a capacitive pad 40 in contact with the earth formation 13. This capacitive pad 40 may be retractable such that, when the capacitive pad 40 is not in contact with the earth formation 13, the capacitive pad 40 may still be in contact with wellbore drilling fluid 50 that resides within the borehole 12. The use of a capacitive pad is illustrative and exemplary only, as other sensor elements may be used, such as a resistive pad. The resistive and capacitive pads may be selected based on their capabilities to sufficiently measure the current in the wells drilled either with conductive water-based drilling fluid (resistive pad) or with non-conductive oil-based drilling fluid (capacitive pad). Conventionally, the resistive pad relates to the devices operating in the frequency range from DC to a few hundred kHz where water-based drilling fluid presents impedances significantly lower than those of the formation and thus often could be ignored. In turn, the capacitive pad relates to the devices operating in the frequency range from a few hundred kHz up to about 100 MHz where impedance of oil-based drilling fluid comparable or much higher those of the formation. The impedance of the oil-based drilling fluid in this frequency range is primarily reactive allowing considering it as an equivalent capacitance connected in series between sensor electrode and the formation.

During deployment or retraction of sensors in the borehole 12, parasitic galvanic leakage may affect performance of the resistivity tool 10. In embodiments, the resistivity tool 10 may employ a protective circuit that reduces or minimizes the effects of parasitic galvanic leakage on resistivity measurement devices. Such leakage may occur when, for example, there are significant differences between the resistivity of a formation and wellbore drilling fluid. Illustrative circuits are discussed below.

Figure 2:
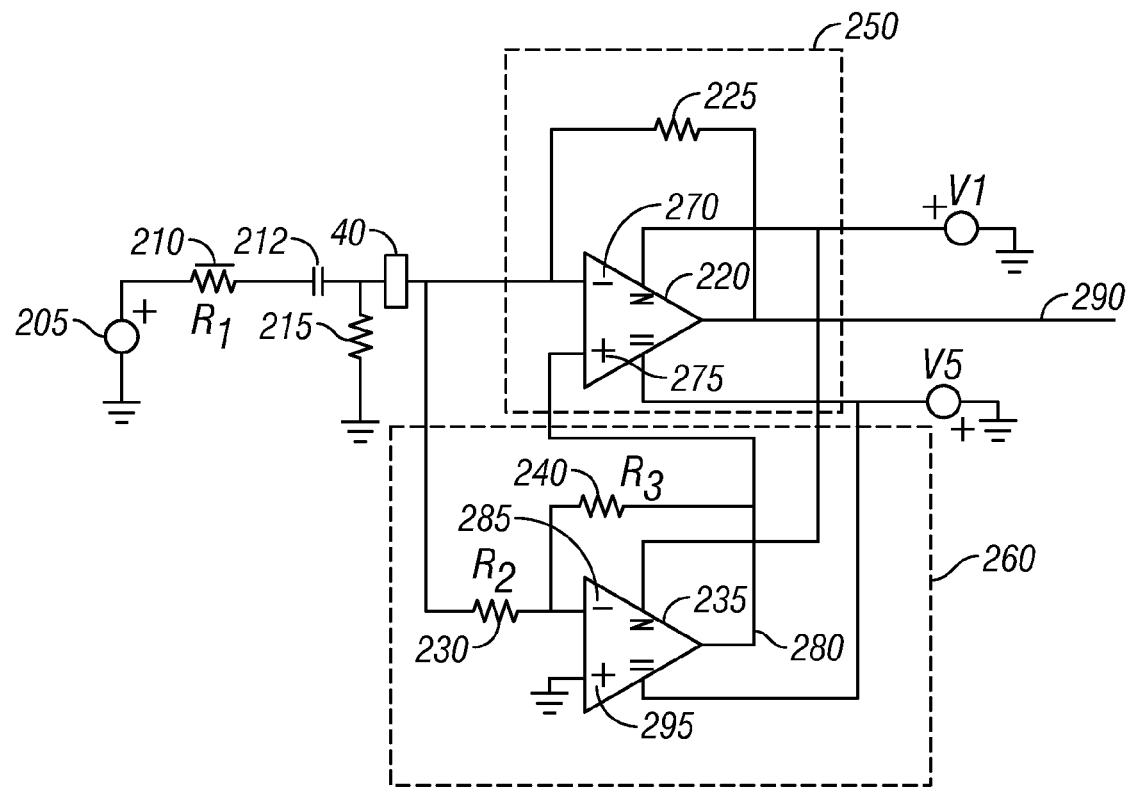
FIG. 2 schematically shows a circuit diagram of one embodiment according to the present disclosure.

As shown in FIG. 2, in one embodiment, a capacitive pad 40 and its related circuitry may be expressed as an equivalent circuit 200. The circuit 200 includes a transmitter voltage source 205 to supply voltage into the formation 13, presented by an equivalent resistance RF 210, equivalent capacitance of the oil-based drilling fluid CF 212, and is subject to leakage into the earth, represented by resistance RL 215. The capacitive pad 40 receives a electric current signal from a transmitter voltage source 205 that may be converted by a current-to-voltage converter 250, herein expressed as an operational amplifier 220 with a 1 k ohm resistor R1 225 between the negative input 270 and voltage output $V_{out}$ 290 of operational amplifier 220 and with the positive input 275 grounded normally (not shown here). Herein, the term "current-to-voltage converter" includes typical current-to-voltage converters, as well as, transimpedance amplifiers and charge amplifiers. The signal from the capacitive pad 40 is also connected to the negative input of operational amplifier 220. The use of an operational amplifier for a current-to-voltage converter is illustrative and exemplary only, as any current-to-voltage converter circuit or output signal device suitable for use in downhole electronic logging may be used within the scope of this disclosure. The use of capacitive pad 40 to supply an input signal to the device is exemplary and illustrative only, as other signal sources may be used to supply the input signal in alternative embodiments according to the present disclosure, such as, but not limited to, an electromagnetic sensor, an optical sensor, a neutron detector, an electric current sensor, a pressure sensor, an accelerometer, and a signal generator. The use of a current-to-voltage converter 250 as the output signal device is also exemplary and illustrative, as embodiments of the present disclosure contemplate any device that may convert a signal current to a voltage Circuit 200 is augmented with a negative error compensator circuit 260 to provide dynamic feedback, herein expressed as a 100 ohm resistor R2 230 connected to the capacitive pad 40 leading to a negative input 285 of another operational amplifier 235, which has a 10 k ohm resistor 240 connected between the negative input 285 and voltage output $V_{out}$ 280 of operational amplifier 235. The negative error compensator circuit voltage output $V_{out}$ 280 is connected to the positive input 295 of operational amplifier 220 (instead of its grounded state when not receiving dynamic feedback), and the positive input of operational amplifier 260 may be grounded. The use of an operational amplifier for a negative error compensator circuit is illustrative and exemplary only, as another negative error amplifying device may be used within the scope of this disclosure. Herein, the term "compensator" refers to any device that may be used to modify, modulate, vary, adjust, alter, stabilize, or change a condition, signal, or state.

Figure 3:
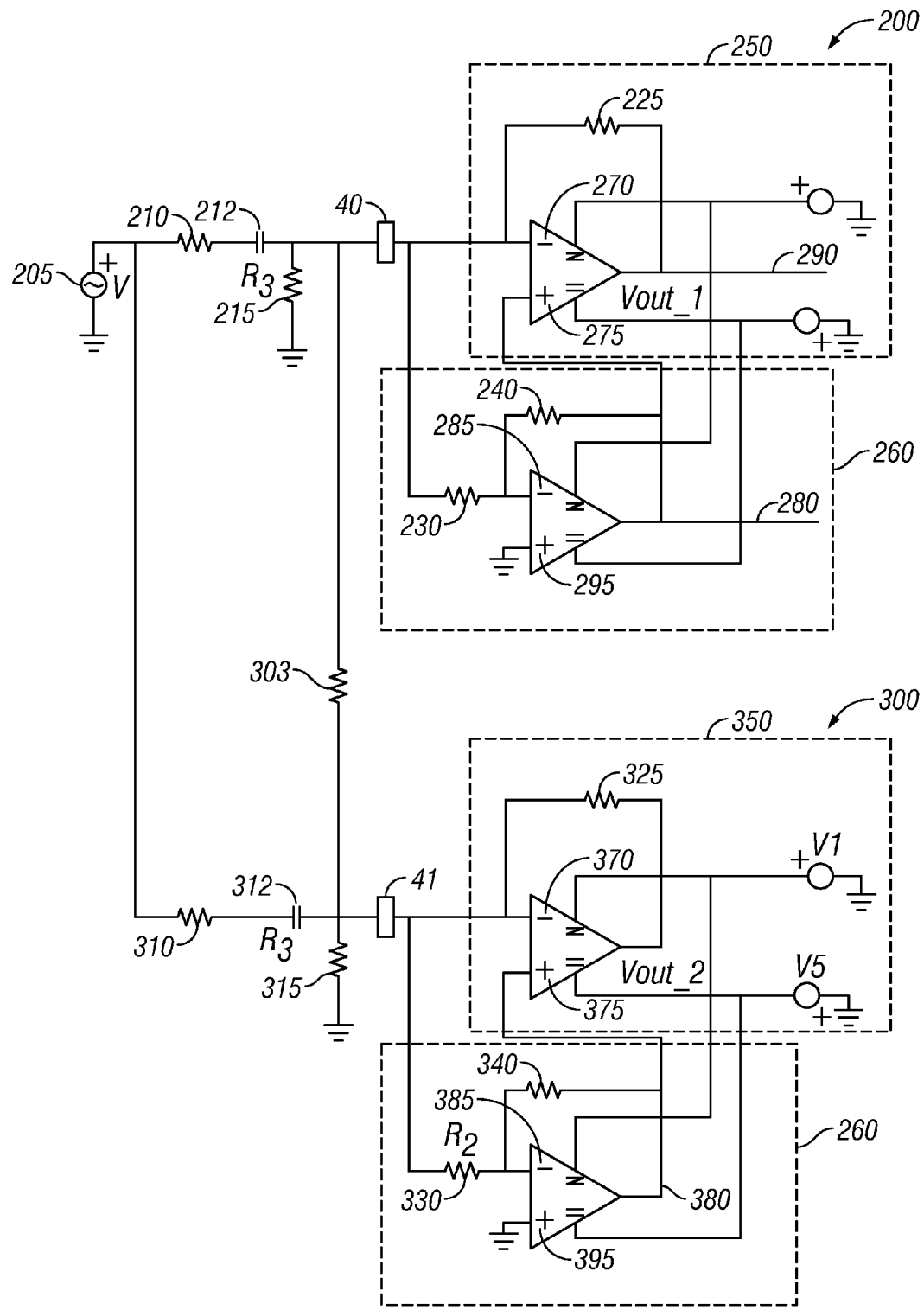
FIG. 3 schematically shows a circuit diagram of another embodiment according to the present disclosure.

In another embodiment, shown in FIG. 3, dual circuits may be used, such that circuit 200 is augmented with at least one additional circuit 300 in parallel with a resistor 303 between the capacitive pad 40 and additional capacitive pad 41.

Herein, circuit 300 is also connected to a transmitter voltage source 205 to supply voltage into the formation 13, which has a resistance RF 310 and capacitance CF 312, and is subject to leakage into the earth, represented by resistance RL 315. The capacitive pad 41 receives a current signal from a transmitter voltage source 205 that may be converted by a current-to-voltage converter 350, herein expressed as an operational amplifier 320 with a resistor 325 between the negative input 370 and voltage output $V_{out}$ 390 of operational amplifier 320 and with the positive input 375 grounded normally (not shown here). The signal from the capacitive pad 41 is also connected to the negative input of operational amplifier 320. The use of an operational amplifier for a current-to-voltage converter is illustrative and exemplary only, as any current-to-voltage converter circuit or device suitable for downhole electronic logging may be used within the scope of this disclosure.

Circuit 300 is augmented with a negative error compensator circuit 360 to provide dynamic feedback, herein expressed as a resistor 330 connected to the capacitive pad 41 leading to a negative input 385 of another operational amplifier 335, which has a resistor 340 connected between the negative input 385 and voltage output $V_{out}$ 380 of operational amplifier 335. The negative error compensator circuit voltage output $V_{out}$ 380 is connected to the positive input 395 of operational amplifier 320 (instead of its grounded state when not receiving dynamic feedback), and the positive input of operational amplifier 360 may be grounded. The use of an operational amplifier for a negative error compensator circuit is illustrative and exemplary only, as another negative error amplifying device may be used within the scope of this disclosure.

The resistance values of resistors R1, R2, and R3 210, 230, 240 are illustrative and exemplary only. These values may be tuned as desired to achieve a level of signal intensity and quality as desired. In some embodiments, one or more of the resistors 210, 230, 240 may be adjustable (rheostat, variable resistor, potentiometer, etc.) such that the circuit 200 may be configured and/or reconfigured to operate in different environments, including, but not limited to, environments with one or more of: oil-based mud and water-based mud. The resistance values of resistors R2 230 and R3 240 herein are non-limiting examples of values providing one suitable ratio for the negative error compensator according to the disclosure. Those skilled in the art with the benefit of the present disclosure will recognize that other values and/or another ratio may be suitable for the negative error compensator without departing from the scope of the disclosure.

The incorporation of negative error amplification providing dynamic feedback allows the current-to-voltage converter to maintain a "virtual ground" potential closer to sensor ground compared to the capacitive pad 40 without dynamic feedback. Depending on logging conditions and drilling fluid selection, the transmitter voltage source may provide alternating current (AC), direct current (DC), or transient electromagnetic energy. In embodiments where multiple sensors are used, a dynamic feedback circuit may be added to each of the associated current-to-voltage converters attached to the sensors.

In an exemplary use, the resistivity tool 10 may traverse the borehole 12 to image the subsurface formation. As noted previously, some resistivity measurement may utilize electrical contact with the wall of the borehole 12. The electrical contact may or may not involve physical contact. In the embodiment shown, the pad 40 electrically engages with the borehole wall to thereby form a path for receiving electrical signals. In instances where there are minimal or negligible undesirable conditions present, then measuring circuit will provide a normal voltage output. In instances where an undesirable condition, such as galvanic leakage is present, then the input current to the measuring circuit will be distorted often resulting in a reduced voltage output, however, the negative error amplification circuit will boost the reduced voltage output to approximately the same level as if the undesirable condition was not present.

Thus one embodiment of the present disclosure presents a method of compensating for the effects of galvanic leakage on a resistivity sensor. By providing negative error amplification, another embodiment provides for a method of imaging a subsurface formation without the signal degradation normally caused as a result of the movement of the sensor from contact with the borehole wall to contact with wellbore fluids while operating within the wellbore. For example (generally while logging in water-based mud), in instances where an undesirable condition, such as galvanic leakage between sensor electrodes is present, then the input current associated with the resistivity measurement signal and received by the measuring circuit will be reduced (resulting in a reduced voltage output).

However, the negative error amplification circuit will force the reduced voltage output to approximately the same level as if the undesirable condition was not present. Therefore, the voltage output recorded will be sufficient for resistivity measurement of the subsurface formation. Embodiments of this disclosure are not restricted to operation with electrically conductive fluids, as this disclosure describes methods and apparatuses for compensating for current leakage whenever the sensor is moved from a point of one resistivity to a point with a second resistivity where an undesirable characteristic may be present.

The undesirable characteristic may be associated current leakage and the inability of a conventional amplifier to maintain "virtual ground" at the inverting input of current-to-voltage converter. In theory, the ideal amplifier as converter should maintain a zero potential difference between its inverting and non-inverting inputs and, if non-inverting input was connected to ground—a zero potential difference between non-inverting input and ground.

For non-ideal amplifiers, when leakage is present, a potential difference across the leakage resistor appears (non-ideal "virtual ground"), i.e. leakage current flows, and this potential difference may be amplified and interferes with the current-to-voltage converter output voltage.

The feedback circuit compares the voltage drop across leakage resistance (i.e., remaining of "virtual ground" voltage) potential difference with the pad ground potential and readjusts the potential at the non-inverting input of current-to-voltage converter. This readjustment is a negative feedback that forces the voltage difference between inverting and non-inverting input of current-to-voltage converter to become closer to zero.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the disclosure.

From the above, it should be appreciated that what has been disclosed includes, in part, an apparatus for estimating a downhole parameter. The apparatus may include a carrier conveyable in a wellbore; a sensor at the carrier, the sensor having a first output signal indicative of the downhole parameter, and the first output signal having an undesirable characteristic; and a negative error compensator electrically coupled to the sensor, the output of the negative error compensator causing a reduction in the undesirable characteristic.

From the above, it should be appreciated that what has been disclosed also includes, in part, a method for estimating a downhole parameter. The method may include coupling a sensor to a carrier conveyable in a wellbore; and coupling a negative error compensator in electrical communication with the sensor.

From the above, it should be appreciated that what has been disclosed also includes, in part, an apparatus for estimating a downhole parameter. The apparatus may include a carrier conveyable in a wellbore; a sensor at the carrier, wherein the sensor includes a current-to-voltage converter and a resistive element, wherein the carrier is configured to receive the sensor such that at least part of the sensor is positioned in electrical communication with a wall of the well bore, and wherein the sensor has a first output signal indicative of the downhole parameter, wherein the first output signal has an undesirable characteristic; a signal source in electrical communication with the sensor; and a negative error compensator electrically coupled to the sensor, wherein the output of the negative error compensator causes a reduction in the undesirable characteristic, and wherein the negative error compensator includes an operational amplifier.

From the above, it should be appreciated that what has been disclosed further includes, in part, a method for estimating a downhole parameter. The method may include coupling a sensor to a carrier conveyable in a wellbore, wherein the sensor includes a current-to-voltage converter and a resistive element, and wherein the carrier is configured to receive the sensor such that at least part of the sensor is positioned in electrical communication with a wall of the wellbore; coupling a negative error compensator in electrical communication with the sensor, wherein the negative error compensator includes an operational amplifier; and conveying the carrier in the wellbore to a position where the sensor is in electrical communication with a wall of the wellbore.

While the disclosure has been described with reference to exemplary embodiments, it will be understood that various changes may be made and equivalents may be substituted for elements thereof without departing from the scope of the disclosure. In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

While the foregoing disclosure is directed to some embodiments of the disclosure, various modifications will be apparent to those skilled in the art. It is intended that all variations within the scope of the appended claims be embraced by the foregoing disclosure.

We claim:

1. An apparatus for modifying an output signal indicative of a downhole parameter, comprising:
    a carrier conveyable in a wellbore in an earth formation;
    an output signal device disposed on the carrier, the device configured to produce the output signal;
    a negative error compensator in communication with the output signal device, the negative error compensator configured to dynamically modify, responsive to the output signal, a characteristic of the same output signal;
    wherein the output signal device comprises a current-to-voltage converter
    wherein the current-to-voltage converter comprises an amplification module having a non-inverting input and an inverting input, and wherein the negative error compensator dynamically modifies the potential difference between the inverting and non-inverting inputs of the current-to-voltage converter to be closer to zero.

2. The apparatus of claim 1, wherein the output signal device comprises a signal source.

3. The apparatus of claim 1, wherein the negative error compensator comprises at least one adjustable resistive element.

4. The apparatus of claim 1, wherein the negative error compensator comprises an operational amplifier.

5. The apparatus of claim 1, wherein the device further comprises a sensor, the sensor configured to produce an input signal for modifying the output signal.

6. The apparatus of claim 1, wherein the amplification module comprises an operational amplifier.

7. The apparatus of claim 1, wherein the current-to-voltage converter has an inverting input, and the negative error compensator maintains a virtual ground potential at the inverting input.

8. The apparatus of claim 5, wherein the carrier is configured to receive the signal source such that at least part of the sensor is positioned in electrical communication with a wall of the wellbore.

9. The apparatus of claim 5, further comprising a transmitter in electrical communication with the sensor.

10. The apparatus of claim 9, wherein the transmitter is configured to supply alternating current.

11. The apparatus of claim 9, wherein the transmitter is configured to supply direct current.

12. A method for modifying an output signal indicative of a downhole parameter, comprising:
    using a negative error compensator to dynamically modify, responsive to the output signal, a characteristic of the same output signal produced by an output signal device in a wellbore
    wherein the output signal device comprises a current-to-voltage converter
    wherein the current-to-voltage converter comprises an amplification module having a non-inverting input and an inverting input, and wherein the negative error compensator dynamically modifies the potential difference between the inverting and non-inverting inputs of the current-to-voltage converter to be closer to zero.

13. The method of claim 12, further comprising:
    conveying a carrier in the wellbore to a position a sensor in electrical communication with a wall of the wellbore;
    receiving, with the sensor, a signal indicative of a downhole parameter; and receiving an input signal with the output signal device from the sensor.

14. The method of claim 12, wherein the output signal device comprises a current-to-voltage converter.

15. The method of claim 12, wherein the carrier is configured to receive the sensor such that at least part of the sensor is positioned in electrical communication with a wall of the wellbore.

16. The method of claim 13, further comprising a transmitter is in electrical communication with the sensor.

17. The method of claim 16, wherein the transmitter is configured to supply alternating current.

18. The method of claim 16, wherein the transmitter is configured to supply direct current.

* * * * *